United States Patent
Grouzdev

(10) Patent No.: US 9,092,251 B2
(45) Date of Patent: Jul. 28, 2015

(54) METHOD OF MANAGING VIRTUAL MACHINES USING A VIRTUAL MACHINE MONITOR

(75) Inventor: Vladimir Grouzdev, Paris (FR)

(73) Assignee: Virtuallogix SA (FR)

( * ) Notice: Subject to any disclaimer, the term of this patent is extended or adjusted under 35 U.S.C. 154(b) by 532 days.

(21) Appl. No.: 12/642,207

(22) Filed: Dec. 18, 2009

(65) Prior Publication Data

US 2010/0162242 A1 Jun. 24, 2010

(30) Foreign Application Priority Data

Dec. 24, 2008 (EP) .................................... 08291242

(51) Int. Cl.
G06F 9/455 (2006.01)
G06F 1/00 (2006.01)
G06F 1/32 (2006.01)

(52) U.S. Cl.
CPC .......... *G06F 9/45558* (2013.01); *G06F 1/3203* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,328,279 B2 * | 2/2008 | Oshins et al. ................. 709/238 |
| 7,543,166 B2 * | 6/2009 | Zimmer et al. ............... 713/310 |
| 7,698,546 B2 * | 4/2010 | Stemen ............................ 713/2 |
| 2002/0143842 A1 * | 10/2002 | Cota-Robles et al. ............ 709/1 |
| 2005/0268078 A1 * | 12/2005 | Zimmer et al. ................... 713/1 |
| 2006/0184938 A1 * | 8/2006 | Mangold .......................... 718/1 |
| 2007/0006227 A1 * | 1/2007 | Kinney et al. ................... 718/1 |
| 2007/0192641 A1 * | 8/2007 | Nagendra et al. ............. 713/320 |
| 2008/0148033 A1 * | 6/2008 | Sumner et al. .................... 713/1 |
| 2008/0276235 A1 * | 11/2008 | Knauerhase et al. ............. 718/1 |
| 2008/0294808 A1 * | 11/2008 | Mahalingam et al. .......... 710/26 |
| 2008/0307213 A1 * | 12/2008 | Sekiguchi et al. ................ 713/1 |
| 2009/0113422 A1 * | 4/2009 | Kani ............................... 718/1 |
| 2009/0119684 A1 * | 5/2009 | Mahalingam et al. ........ 719/324 |
| 2009/0165117 A1 * | 6/2009 | Brutch et al. .................. 726/14 |
| 2010/0115315 A1 * | 5/2010 | Davis et al. ................... 713/323 |

OTHER PUBLICATIONS

European Search Report; European Patent Application No. EP 08 29 1242; May 11, 2009; 5 pages.

* cited by examiner

*Primary Examiner* — Tammy Lee
(74) *Attorney, Agent, or Firm* — Beem Patent Law Firm

(57) ABSTRACT

A method for managing virtual machines, the method comprising providing a virtual Advanced Configuration and Power Interface, ACPI, arranged to interact with the virtual machines, and interacting with a real ACPI based on interaction between the virtual ACPI and the plurality of virtual machines.

11 Claims, 2 Drawing Sheets

METHOD OF MANAGING VIRTUAL MACHINES USING A VIRTUAL MACHINE MONITOR

CROSS-REFERENCE TO RELATED APPLICATIONS

This U.S. patent application claims the benefit of priority from European patent application no. 08291242.9, filed Dec. 24, 2008.

BACKGROUND OF THE INVENTION

1. Field of the Invention

Embodiments of the invention relate to a virtual machine monitor and a method of managing virtual machines. In particular, embodiments of the invention relate to the provision of virtual ACPI functionality to virtual machines.

2. Description of the Related Art

Virtualisation may be used, for example, to use a single data processing system, such as a computer, to run multiple operating systems. The operating systems may be different, or may include multiple instances of a single operating system. One reason for using virtualisation is server consolidation, where servers executing in different operating systems are executed using a single data processing system. Such an approach may reduce the cost of implementing the servers as fewer data processing systems may be required, and/or may increase the utilisation of the components of the data processing system.

Operating systems and/or applications such as server applications that execute in the operating systems may execute normally under virtualisation with little or no modification to the operating systems or applications. Virtualisation software is provided that provides a virtual platform that is a simulation of some or all of the components of the data processing system to the operating systems. Therefore, the operating systems and applications use the "virtual" components of the virtual platform. The virtualisation software (often called a virtual machine monitor, VMM) monitors use of the virtual components of the various virtual platforms and allocates use of the "real" components of the data processing system to the operating systems based on use of the corresponding virtual components. An operating system and the applications executing in it are called a virtual machine.

Some data processing systems include Advanced Configuration and Power Interface (ACPI) capabilities. ACPI is a standard for device configuration and power management in data processing systems such as computers. ACPI may be used to manage power usage and performance of the components of the data processing system or the system itself. An operating system executing on the data processing system may provide commands to ACPI functions in a BIOS of the data processing system, causing the data processing system to, for example, report on status of components of the data processing system and/or change the power or performance state of the components or the system. The latest version of the ACPI Specification, currently version 3.0b, is incorporated herein by reference and is available from, for example, http://www.acpi.info/spec.htm.

SUMMARY OF THE INVENTION

Aspects of embodiments of the invention are set out in the claims.

BRIEF DESCRIPTION OF THE DRAWINGS

Embodiments of the invention will now be described, by way of examples only, with reference to the accompanying drawings, in which.

DETAILED DESCRIPTION OF EMBODIMENTS OF THE INVENTION

Embodiments of the invention provide a virtual Advanced Configuration and Power Interface (ACPI) to virtual machines in a data processing system. For example, software may be provided, for example as part of a virtual machine monitor (VMM) or otherwise, that provides ACPI functionality to one or more virtual machines such that the virtual machines may interact with the ACPI functionality. The software may then interact with the ACPI functionality of the data processing system, for example with the ACPI functions in the BIOS, based on the interaction with the virtual machines.

For example, a device may be shared between a plurality of virtual machines so that some or all of the functionality of that device is available to the virtual machines. Where multiple virtual machines assert using the virtual ACPI functionality that the device should be in a respective power state, then embodiments of the invention determine a power state for the device from the power states as asserted by the virtual machines. For example, the power state chosen for the device may be the maximum power state from the respective power states asserted by the virtual machines. Thus, power savings may be achieved, while the device is maintained in a power state that should not affect performance of the device for the virtual machine that asserted the highest power state. Embodiments of the invention may maintain "virtual" power states for the device in respect of each of the virtual machines. Therefore, the device may be in a first power state while appearing to a virtual machine to be in a different power state that was asserted by that virtual machine. A device may be shared between some or all of the virtual machines on the data processing system.

Figure 1:
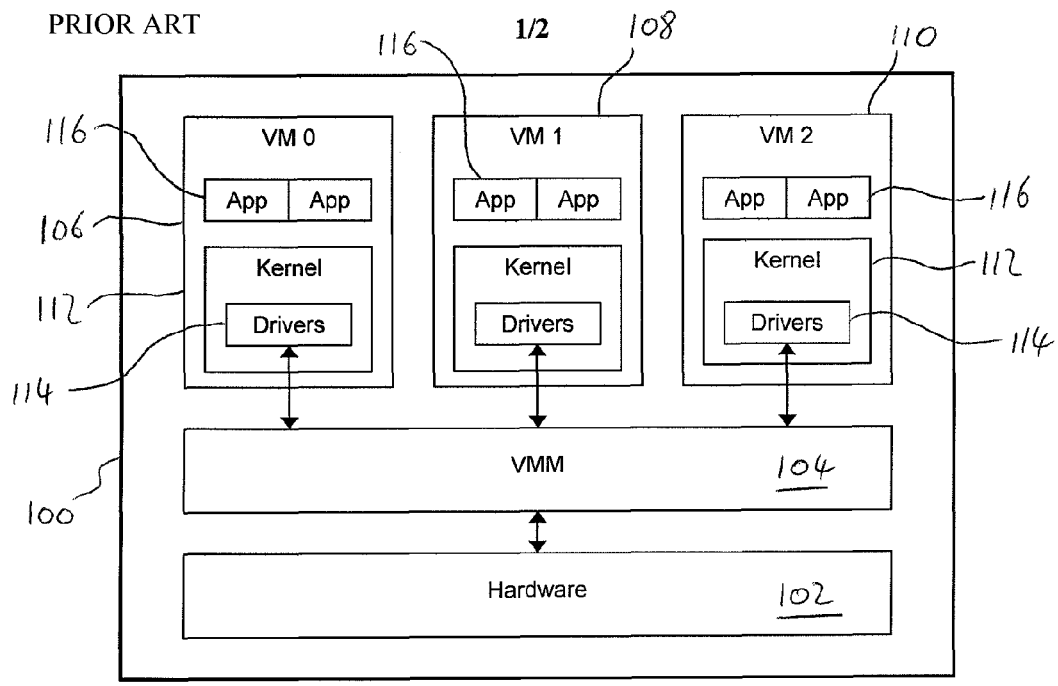
FIG. 1 shows an example of a known virtualisation system.

FIG. 1 shows an example of a known virtualisation system. A data processing system 100 includes hardware 102. The hardware 102 may comprise, for example, a CPU, on-board devices, expansion cards such as PCI devices and other hardware. A virtual machine monitor (VMM) 104 is executing on the data processing system 100 and monitors three virtual machines 106, 108 and 110. Each virtual machine includes a respective operating system kernel 112 that includes drivers 114. The drivers 114 may interact with the virtual machine monitor 104 to make use of devices and other hardware 102 in the data processing system 100. Each virtual machine 106, 108 and 110 may also include one or more applications 116 executing on the operating system within that virtual machine.

To make use of at least some of the devices and other hardware within the hardware 102, drivers 114 within a virtual machine 106, 108 or 110 interacts with the virtual machine monitor 104. This may be done transparently to the operating system or drivers within the virtual machine. The virtual machine monitor 104 then interacts with the hardware 102 such that functions or data requested by the virtual machine can be fulfilled. For example, an application 116 in a virtual machine may require data to be sent using a network interface card (NIC) in the hardware 102 of the data processing system 102. The virtual machine monitor 104 presents a virtual NIC to the virtual machine and optionally other virtual machines. The drivers 114 in the virtual machine send appropriate information to the virtual NIC in the virtual machine monitor 104. The virtual machine monitor 104 then provides appropriate information to the real NIC in the hardware 102, thus causing it to send the data required to be sent by the virtual machine.

Figure 2:
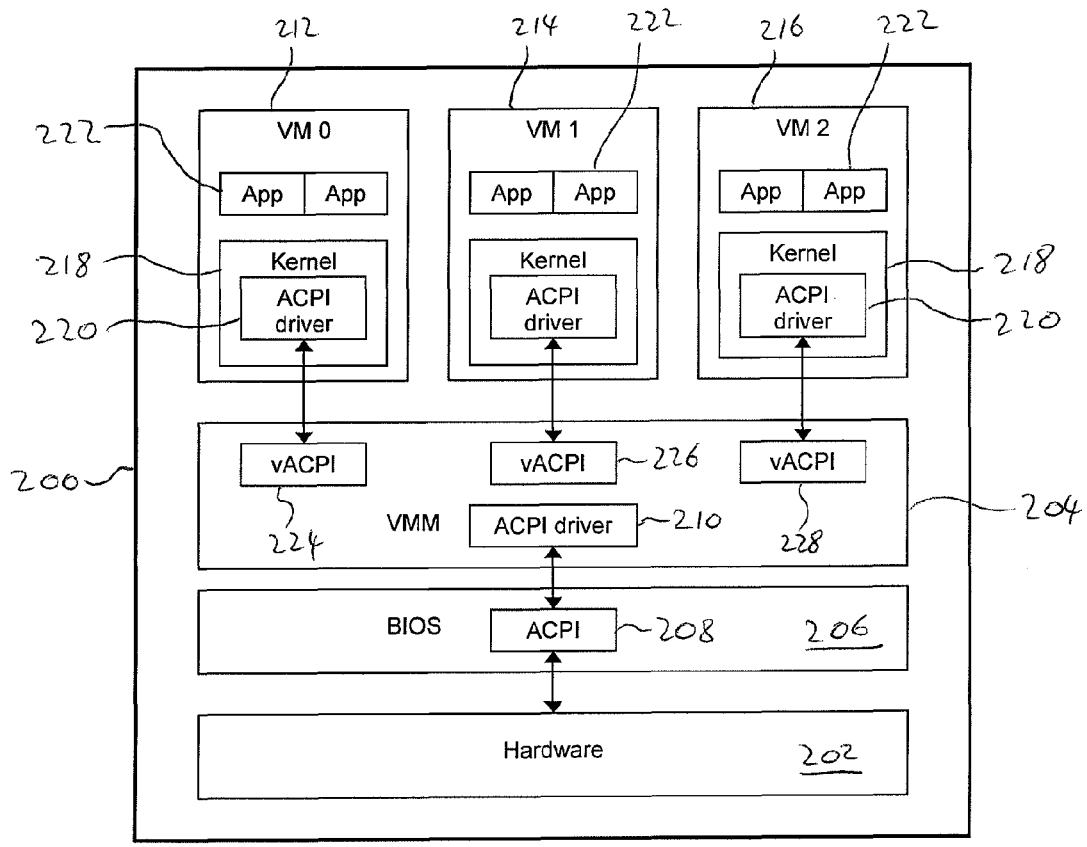
FIG. 2 shows an example of a data processing system including virtualisation according to embodiments of the invention.

FIG. 2 shows an example of a data processing system 200 according to embodiments of the invention. The data processing system 200 includes hardware 202 and a virtual machine monitor 204. The data processing system 200 also includes a BIOS 206 including ACPI routines 208 that may be used by an ACPI driver to interact with the configuration and power state of devices in the data processing system. As described herein, devices may include the data processing system itself as well as CPUs, on-board devices, expansion devices such as PCI cards, power resources and/or other devices. The virtual machine monitor 204 includes an ACPI driver 210 for interacting with the BIOS ACPI routines 208.

The data processing system 200 shown in FIG. 2 includes three virtual machines 212, 214 and 216 executing on the data processing system 200, although this is not a requirement and there may be zero, one or more than one virtual machine. Each virtual machine includes a kernel 218 including an ACPI driver 220 and may also include one or more applications 222. The virtual machine monitor 204 presents to each virtual machine 212, 214 and 216 a respective virtual Advanced Configuration and Power Interface (vACPI) 224, 226 and 228. That is, the vACPI appears to the associated virtual machine to be a real ACPI and the virtual machine can interact with the vACPI using the ACPI drivers 220. However, interaction between a virtual machine 212, 214 or 216 and its associated vACPI 224, 226 or 228 may or may not be passed to the BIOS ACPI routines 208 in altered or unaltered form by the virtual machine monitor ACPI driver 210.

The virtual machine monitor 204 may present a virtual ACPI to the virtual machines 212, 214 and 216 by providing virtual ACPI tables to the virtual machines. When the data processing system 200 is first powered on, real ACPI tables are created in memory (not shown) by the BIOS ACPI routines 208 that describe the ACPI capabilities and functions of the system 200. These include a Root System Description Pointer (RSDP) that points to a Root System Description Table (RSDT). The RSDT points to a Fixed ACPI Description Table (FADT), Firmware ACPI Control Structure (FACS) and Multiple APIC Description Table (MADT). The FADT points to a Differentiated System Description Table (DSDT) that includes the Differentiated Definition Block (DDB).

An operating system executing on a system without virtualisation locates the RSDP in system memory when it is started. The RSDT and other tables can then be located. The operating system typically creates an ACPI Namespace that is a hierarchical structure of all of the ACPI devices of the system that were described in the ACPI tables, particularly the DDB. The DDB contains a list of all of the ACPI devices and includes methods, in ACPI Machine Language (AML), for interacting with the ACPI BIOS routines 208 for controlling the ACPI devices. The operating system also copies these methods, called objects, into the ACPI Namespace, so the ACPI Namespace is a hierarchical list of the ACPI devices along with the methods (objects) that can be used to control and interact with them.

Embodiments of the invention provide virtual ACPI tables to each of the virtual machines. For example, for a virtual machine, the virtual machine monitor (VMM) 204 may provide a virtual RSDP (vRSDP), a virtual RSDT (vRSDT), a virtual FADT (vFADT), a virtual FACS (vFACS), a virtual MADT (vMADT) and a virtual DSDT (vDSDT). Thus, an operating system in a virtual machine may locate its vRSDP and from there locate the other virtual tables associated with that virtual machine. The VMM 204 may also provide virtual versions of other ACPI tables and data structures as appropriate.

Information in the virtual ACPI tables may be derived at least in part from the real ACPI tables. For example, input/output (I/O) ports specified in the vFADT may be directly inherited from the FADT. The virtual machine monitor 204 may provide virtual versions of the ACPI hardware register blocks of the data processing system 200, including, if available and defined in the real FADT, a SMI command port, PM1 and PM2 blocks, and General Purpose Event (GPE) 0 and 1 blocks.

The vFADT may also define an ACPI reset function that can be used by the associated virtual machine, even if the reset feature is not supported by the hardware of the data processing system 200. This is so that an operating system can reset itself and the virtual machine that contains it.

The virtual machine may also provide a virtual Differentiated System Description Table (vDSDT) containing a Differentiated Definition Block (DDB), and an example of creation of the vDSDT is as follows. On system startup, the real ACPI namespace may be created by the virtual machine monitor. For each object in the real ACPI namespace, the virtual machine monitor 204 determines whether the object is visible to the operating system in the virtual machine for which the vDSDT is being created. For a visible object, a wrapper method is created in the DDB of the vDSDT for that object. The wrapper method interacts with the virtual machine monitor 204 and may invoke methods in the virtual machine monitor 204 as described later.

The visibility of an object to a virtual machine may be determined based on one or more of the following criteria. A child of an invisible object is invisible. A leaf object (that is, an object associated with a device that is usable by only one of the virtual machines in the data processing system 200) with a non-public name is invisible. A processor object not executing the virtual machine and not usable by the virtual machine is invisible. A device object corresponding to a device "owned" by the virtual machine monitor, such as corresponding to XT-PIC, Programmable Interrupt Timer (PIT) or Real Time Clock (RTC) devices, is invisible. A device object corresponding to a non-PCI device using I/O ports or memory unavailable to the virtual machine is invisible. A device object corresponding to a PCI device located in a hidden PCI slot is invisible. The object may also be invisible due to other criteria as appropriate. Otherwise, the object is visible. Thus, the vDSDT may describe only those objects corresponding to physical devices that are available to the virtual machine, and the hardware described in the vDSDT may comprise some or all of the hardware described in the real DSDT.

The virtual machine monitor may also include in the vDSDT purely virtual devices such as a virtual XT-PIC, PIT, RTC and/or other devices.

The wrapper methods in the DDB of a virtual DSDT (vDSDT) are methods for interacting with the virtual machine monitor 204 rather than the BIOS ACPI routines 208. The wrapper methods may be used to obtain an object value for a data object or perform control of a device for a control method object. Therefore, on startup the operating system in a virtual machine creates its ACPI namespace that includes ACPI methods comprising the wrapper methods.

When the operating system or an application executing in the virtual machine wishes to interact with a virtual device, it uses the ACPI drivers 220 in the kernel 218 to invoke the appropriate wrapper control method, which in turn invokes an appropriate action in the virtual machine monitor 204. In embodiments of the invention, the ACPI namespace includes ACPI methods that can be used by the operating system in the virtual machine to interact directly with one or more real physical devices in the data processing system. For example, such devices may be those devices that are managed by and/or used exclusively by the operating system and/or applications in that virtual machine.

In embodiments of the invention, a dedicated virtual I/O port, called the virtual ACPI (vACPI) interface port, is provided between the virtual machine monitor 204 and each virtual machine 212, 214 and 216, so that data can be exchanged between the AML wrapper methods within a virtual machine and the virtual machine monitor 204. When a wrapper method is called in a virtual machine, the object path and any arguments are transformed by an AML interface into a byte stream that is sent to the virtual machine monitor 204 over the vACPI interface port. A result is returned by the virtual machine monitor 204 as a byte stream over the vACPI interface port, and the AML interface transforms the byte stream into an AML data object (such as, for example, an integer, string, buffer, package or reference data object type).

The virtual machine monitor 204 then performs vACPI namespace object evaluation, whereby the vACPI namespace object that was invoked in the virtual machine is evaluated. This is a three-stage process, comprising preprocessing, object evaluation and post-processing. The preprocessing stage may modify the object path or arguments if required. For example, a _PRS (possible resource settings) object path can be replaced by a _CRS (current resource settings) object path when dynamic resource configuration is not supported.

The object evaluation stage is optional and is carried out when required. The object evaluation stage may, for example, invoke a real ACPI object for the virtual ACPI object visible in the vACPI namespace of the virtual machine.

The post-processing stage may modify a result returned by the object evaluation. For example, any objects in or referred to in the result that are invisible in the vACPI namespace are removed from the result, and/or some or all real ACPI objects are substituted with corresponding virtual ACPI objects. For visible PCI devices, for example, real IRQ values may be replaced with virtual IRQ values.

The data processing system 200 may include one or more leaf devices that are devices assigned to a maximum of one of the virtual machines 212, 214 and 216. The data processing system 200 may also include one or more shared nexus devices, which are devices that are shared between multiple ones of the virtual machines, for example some or all of the virtual machines. A shared nexus device is also a device that has at least two of its children assigned to different virtual machines or at least one of its children is a shared nexus device.

For a shared nexus device, embodiments of the invention maintain a respective virtual device state for each of the virtual machines that can use the device. The virtual device state for a virtual machine may be, for example, the state that the vACPI objects virtual machine have indicated to the virtual machine monitor 204 to be the state in which the device should be operating. The virtual state for a device may be different between virtual machines. Hence, the virtual machine monitor 204 may resolve the virtual device states into an actual device state, and may also invoke ACPI routines to put the device into the actual device state. The virtual device states may be maintained within the vACPI 224, 226 and 228 of the respective virtual machines 212, 214, and 216. In embodiments of the invention, the form of a device state may depend on the type of associated device. For example, a processor device may have a device state that comprises power, performance and throttling states, whereas another type of device may have a device state that comprises only a power state.

For example, the virtual machine monitor may use a "maximum" principle when deciding the actual device state from the virtual device state. A virtual device state may comprise, for example, a power state, performance state and/or clock throttling state of the device. The "maximum" principle selects the maximum power state and/or maximum performance state for the device, or the clock throttling state that results in maximum performance of the device. Thus, the device is not put into a state that results in lower power and/or lower performance of the device as requested by any of the virtual machines, while at the same time at least some power saving or performance reduction may be achieved. From the point of view of an operating system in a virtual machine, the device is in the virtual state, even if the actual state of the device is a higher power and/or performance state. In certain embodiments of the invention, where a virtual machine does not support or use functionality for changing the power, performance or throttling state of a device, it is assumed that the maximum power or performance state is required. For example, if an operating system in a virtual machine does not support power management of a CPU, then the CPU will always be in the C0 (highest power) state, irrespective of the virtual power states of the CPU from other virtual machines.

For example, wrapper methods of the vACPI namespace of an operating system in a virtual machine that attempt to change the state of a device may invoke methods in the virtual machine monitor 204 that change the virtual state of the virtual device and resolve all of the virtual device states into an actual device state. The virtual machine monitor 204 may then set the device state to the actual device state.

A general device (for example, an on-board device) may have a power state selected from D0, D1, D2 and D3 states. The D0 state is considered to be the maximum power state and D3 the minimum power state. For a CPU device, the device power states are C0, C1, C2 and C3, where C0 is the maximum power state and C3 is the minimum power state. For CPU performance states P0, P1, P2, . . . , P0 is considered to be the maximum performance state and P1, P2, . . . are progressively lower performance states. The clock throttling states T0, T1, T2, . . . include a minimum throttling state (maximum performance) T0 and T1, T2, . . . are states of progressively more throttling of the CPU clock frequency.

Each device may have one or more associated power resources that are required by the device to provide power in the various power states of the device. A power resource may be on, where it may be providing power to one or more devices, or off. Where a power resource is required by a single device in certain power state, the virtual machine monitor 204 may turn the device off using ACPI control methods when the device is in a power state that does not require the power resource.

A power resource is shared when it is required by at least one shared nexus device or by at least two leaf devices assigned to different virtual machines. The virtual machine monitor 204 may resolve an actual power state of a shared power resource from respective virtual power states associated with multiple ones of the virtual machines 212, 214 and 216 that can use the device or devices that require the shared power resource. For example, if at least one virtual power resource state requires that the power resource is on, then the actual state for the power resource is on, and if all of the virtual states are off then the actual power state will be off. The actual power state of the power resource is controlled by the virtual machine monitor 204.

In embodiments of the invention, where there are nexus PCI devices in the data processing system 200, the virtual machine monitor 204 controls the state of the PCI devices using a PCI configuration space. The virtual machine monitor 204 may control the PCI device to enter a particular power state by writing an appropriate command to the Power Management (PM) Control register. The state of the device can be queried using a PM Status register. For each nexus PCI device, the virtual machine monitor 204 maintains respective virtual PM Status and Control registers for the virtual machines 212, 214 and 216 that can use the PCI device. The virtual machine monitor 204 may then resolve the states in the virtual PM Control registers into an actual power state in a manner similar to that described above in respect of other devices.

Embodiments of the invention may also allow a virtual machine operating in a normal, working system state (S0) to suspend to a sleep state (S1, S2, S3 or S4) or power off (S5). Thus, a virtual system state of each of the virtual machines 212, 214 and 216 may be maintained by the virtual machine monitor 204, for example in each vACPI 224, 226 and 228. The virtual machine monitor 204 may also set the system state of the data processing system 200 to be the maximum of the virtual system states, where S0 is the highest state and S5 is the lowest state. A virtual machine entering a sleep state (S1, S2, S3 or S4) or power off state (S5) may instruct the devices used by that virtual machine to enter a lower power state, and thus the virtual state of these devices is set to a lower power state. If these devices are shared with one or more other virtual machines, then the virtual machine monitor resolves the actual state of the device as indicated above.

Embodiments of the virtual machine monitor may power off the data processing system into the power off (S5) state when, for example, all virtual machines are in the power off state or a selected one or more of the virtual machines are in the power off state.

A virtual machine in a sleep state (S1, S2 or S3) can awaken following an external event from either a power button or a waking device used by the virtual machine. In certain cases it may not be possible to wake from a waking device (a device that can wake the virtual machine) if, for example, the waking device was not put into a low power state when the virtual machine entered a sleep state, for example if the waking device is shared with other virtual machines. In this case, a waking mechanism of the device may not be operational. When a waking device indicates that a waking event has occurred, one or more virtual machines in a sleep state may be woken depending on which virtual machines use the device.

In certain embodiments, virtual power buttons may be provided that are usable by one or more of the virtual machines to control the power state of one or more other virtual machines, for example to wake another virtual machine from a sleep state or to power on to a working state (S0).

In certain embodiments, a device may notify an operating system of the data processing system 200 of a notification event. That is, the device notifies the operating system of an event relating to the device, such as, for example, change of a battery status, change of a thermal zone status or a power button press. The event triggers an appropriate real ACPI namespace object for the device. The virtual machine monitor 204 provides a virtual I/O port, the vACPI notification port, between the virtual machine monitor 204 and each of the virtual machines which can use a device for which a notification event can occur. The vACPI namespace for a virtual machine may include one or more objects that are General Purpose Event (GPE) handler methods. When a notification event occurs for a device, the event is detected by the virtual machine monitor 204. The virtual machine monitor 204 then emulates a GPE event to the virtual machine. The appropriate GPE handler method is invoked in the virtual machine. The handler method may then issue a request to the virtual machine monitor 204 using the vACPI notification port, and the virtual machine monitor 204 responds by sending the event number that is provided to or obtained by the virtual machine monitor 204 to the handler method. In this way, for example, an ACPI notification event is converted to an equivalent vACPI notification event.

Figure 3:
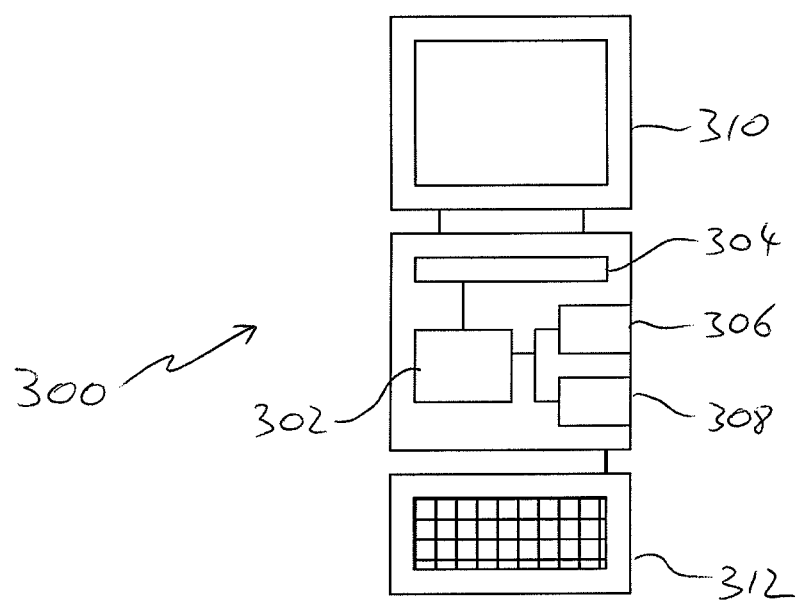
FIG. 3 shows an example of a data processing system suitable for use with embodiments of the invention.

FIG. 3 shows an example of a data processing system 300 that is suitable for use when implementing embodiments of the invention. The data processing system 300 includes a central processing unit (CPU) 302 and a main memory 304. The system 300 may also include a permanent storage device 306, such as a hard disk, and/or a communications device 308 such as a network interface controller (NIC). The system 300 may also include a display device 310 and/or an input device 312 such as a mouse and/or keyboard.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Embodiments of the invention are not restricted to the details of any foregoing embodiments. Embodiments of the invention extend to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments that fall within the scope of the claims.

The invention claimed is:

1. A method for managing virtual machines that use one or more physical devices in a data processing system, the method comprising:
   providing, in a Virtual Machine Monitor (VMM), a virtual Advanced Configuration and Power Interface (ACPI) arranged to interact with the virtual machines;
   interacting the VMM with a real ACPI based on interaction between the virtual ACPI and the plurality of virtual machines;
   providing, in at least one of the virtual machines, an ACPI driver in a kernel to enable the at least one of the virtual machines to interact directly with one or more of said physical devices;
   maintaining, within the virtual ACPI, a respective virtual device state of the physical device for each of the multiple ones of the virtual machines, wherein the virtual device state includes at least one of a device performance state, a device power state, or a device clock throttling state, the device power state includes at least one intermediate power setting between a maximum power setting and a power-off setting, wherein each virtual device state is requested by a corresponding one of the virtual machines;

determining a maximum requested device state from the virtual device states; and setting, by the VMM, a real device state for the physical device based on the maximum requested device state.

2. A method as claimed in claim 1, wherein the physical device is one of a data processing system, on-board device, PCI device, power resource, or CPU.

3. A method as claimed in claim 1, comprising interacting with a leaf device based on interaction between the virtual machine monitor and one of the virtual machines to which the leaf device is assigned.

4. A method as claimed in claim 1, comprising providing virtual power buttons waking devices that are usable by the virtual machines to send ACPI waking device notification events to others of the virtual machines.

5. A method as claimed in claim 1, comprising receiving a first event notification from the real ACPI, and providing a second event notification to one or more of the virtual machines based on the first event notification.

6. A method as claimed in claim 5, comprising determining an event number of the first event notification, and providing the event number to one of the virtual machines in response to a query from that virtual machine.

7. A method as claimed in claim 1, comprising providing to each virtual machine respective virtual ACPI tables corresponding to physical devices available to the virtual machine.

8. A method as claimed in claim 7, comprising adding one or more wrapper control methods corresponding to the physical devices available to one of the virtual machines to a virtual Differentiated System Description Table, vDSDT, for the virtual machine.

9. A method as claimed in claim 1 comprising using the VMM to provide the virtual ACPI, interact the VMM with the real ACPI, and provide the ACPI methods.

10. A method as claimed in claim 1 comprising using the data processing system to provide the virtual ACPI, interact the VMM with the real ACPI, and provide the ACPI methods.

11. A non-transitory computer readable medium storing a computer program for managing virtual machines that use one or more physical devices in a data processing system, wherein at least one of said physical devices are shared between multiple ones of the virtual machines, comprising:

providing, in a Virtual Machine Monitor (VMM), a virtual Advanced Configuration and Power Interface (ACPI) arranged to interact with the virtual machines;

interacting the VMM with a real ACPI based on interaction between the virtual ACPI and the plurality of virtual machines;

providing, in at least one of the virtual machines, an ACPI driver in a kernel to enable at least one of the virtual machines to interact directly with one or more of said physical devices;

maintaining, within the virtual ACPI, a respective virtual device state of the physical device for each of the multiple ones of the virtual machines, wherein the virtual device state includes at least one of a device performance state, a device power state, or a device clock throttling state, the device power state having at least three different possible values, wherein each virtual device state is requested by a corresponding one of the virtual machines;

determining a maximum requested device state from the virtual device states; and setting, by the VMM, a real device state for the physical device based on the maximum requested device state.

* * * * *